United States Patent [19]
Chawki et al.

[11] Patent Number: 5,745,269
[45] Date of Patent: *Apr. 28, 1998

[54] METHOD FOR THE MANAGEMENT OF WAVELENGTH-DIVISION-MULTIPLEXED OPTICAL LOOPS

[75] Inventors: Mouhammad Jamil Chawki, Lannion; Ivan Le Gac, Perros Guirec; Valérie Tholey, Lannion, all of France

[73] Assignee: France Telecom, Paris, France

[*] Notice: The term of this patent shall not extend beyond the expiration date of Pat. No. 5,576,875.

[21] Appl. No.: 611,646

[22] Filed: Mar. 6, 1996

[30] Foreign Application Priority Data

Mar. 21, 1995 [FR] France .................. 95 03292

[51] Int. Cl.[6] .......................... H04B 10/20; H04J 14/00
[52] U.S. Cl. ................ 359/119; 359/125; 359/133; 359/166; 359/167; 370/390; 370/432; 370/480
[58] Field of Search ........................... 359/119, 125, 359/133, 167, 166, 127, 124; 370/390, 432, 436, 480

[56] References Cited

U.S. PATENT DOCUMENTS 4,730,301  3/1988  McMahon ........................ 359/119
5,576,875  11/1996  Chawki et al. .................. 359/119

FOREIGN PATENT DOCUMENTS 0497005   8/1992   European Pat. Off. .
63-272132  11/1988  Japan .
5292110   11/1993  Japan .

OTHER PUBLICATIONS

Electronics Letters, vol. 30, No. 16, Tholey et al., *Demonstration of WDM Survivable Unidirectional Ring Network Using Tunable Channel Dropping Receivers*, p. 1323, Aug. 1994.

Digital Technology—Spanning the Universe, Jun. 12–15, 1988, *A High–Speed Flooding Optical Local Area Network*, Kavehrad et al., pp. 1497–1501.

Primary Examiner—Kinfe-Michael Negash
Attorney, Agent, or Firm—Nilles & Nilles SC

[57] ABSTRACT

A method for the management of a one-directional optical management loop with optical frequency multiplexing. This method is characterized chiefly in that the central station (T) instructs a secondary station (Si) that it designates to tune its reception to a determined wavelength ($\lambda j$), on the basis of a message broadcast permanently to all the secondary stations (S1–Sn) on all the channels of the frequency multiplex. This method can be applied to any type of telecommunications network.

18 Claims, 3 Drawing Sheets

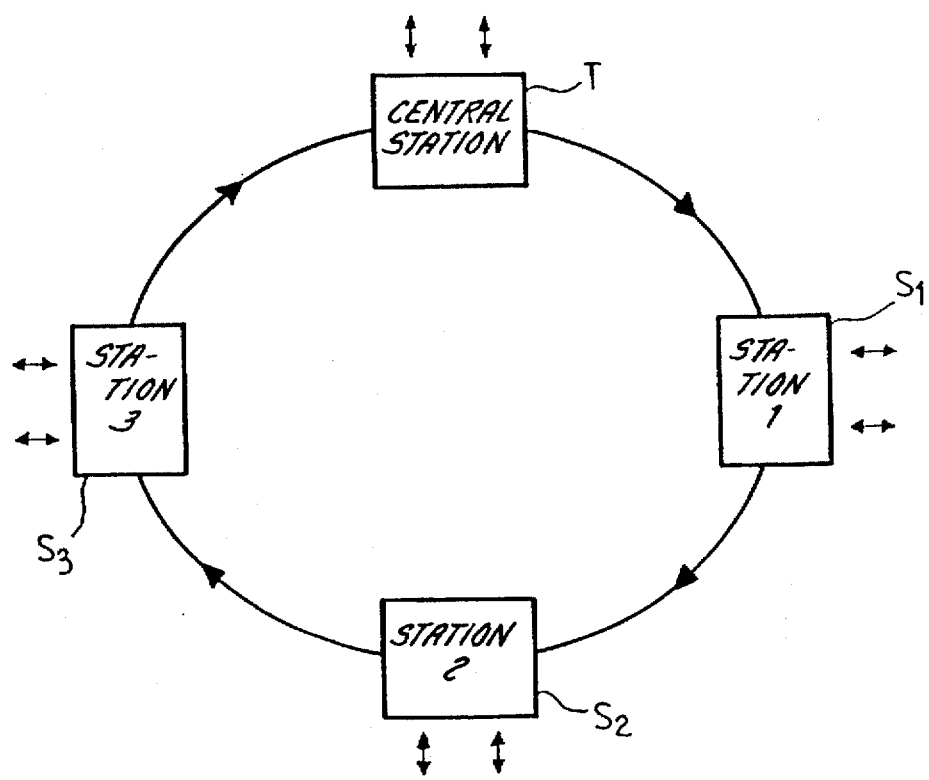
FIG_1

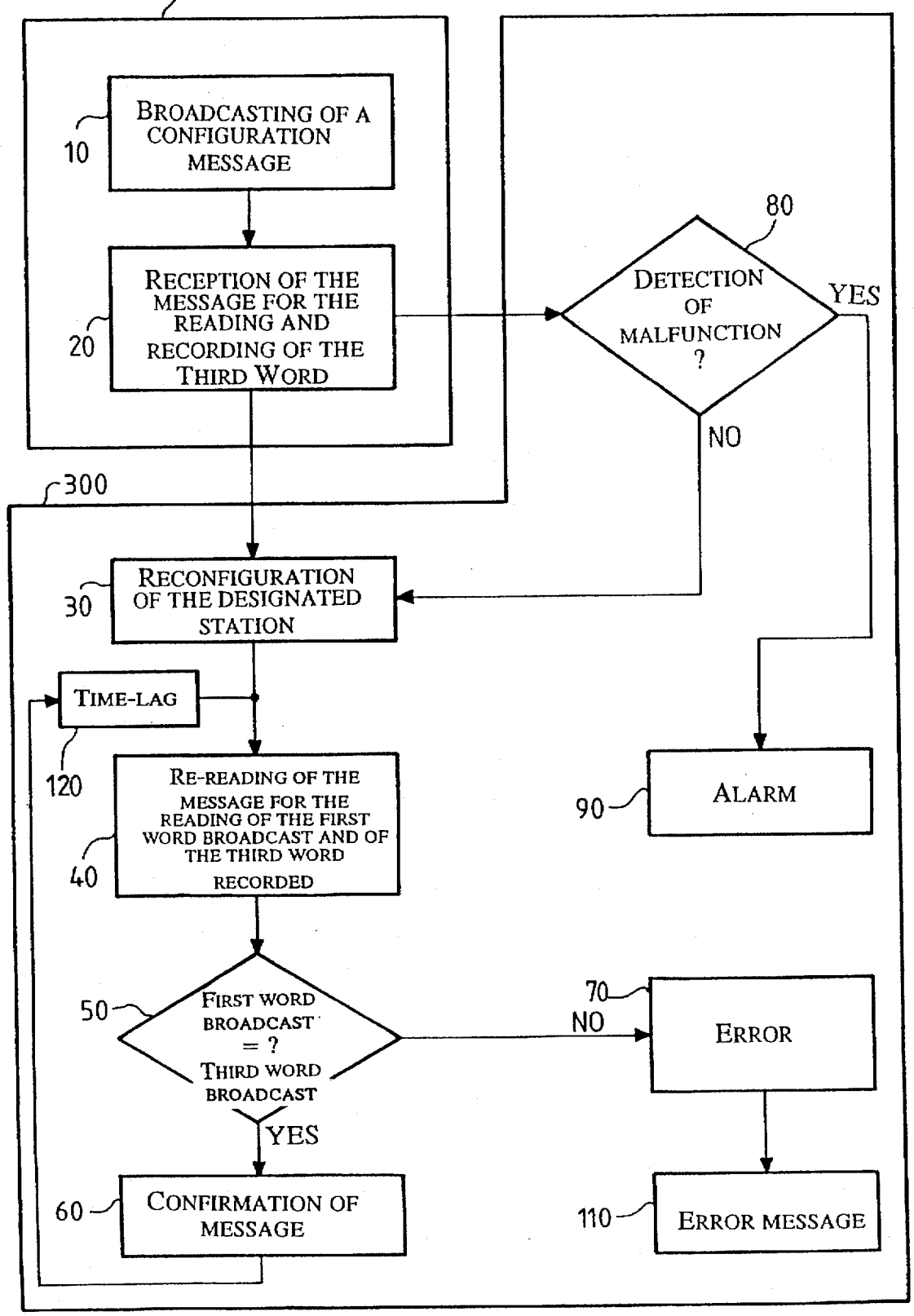

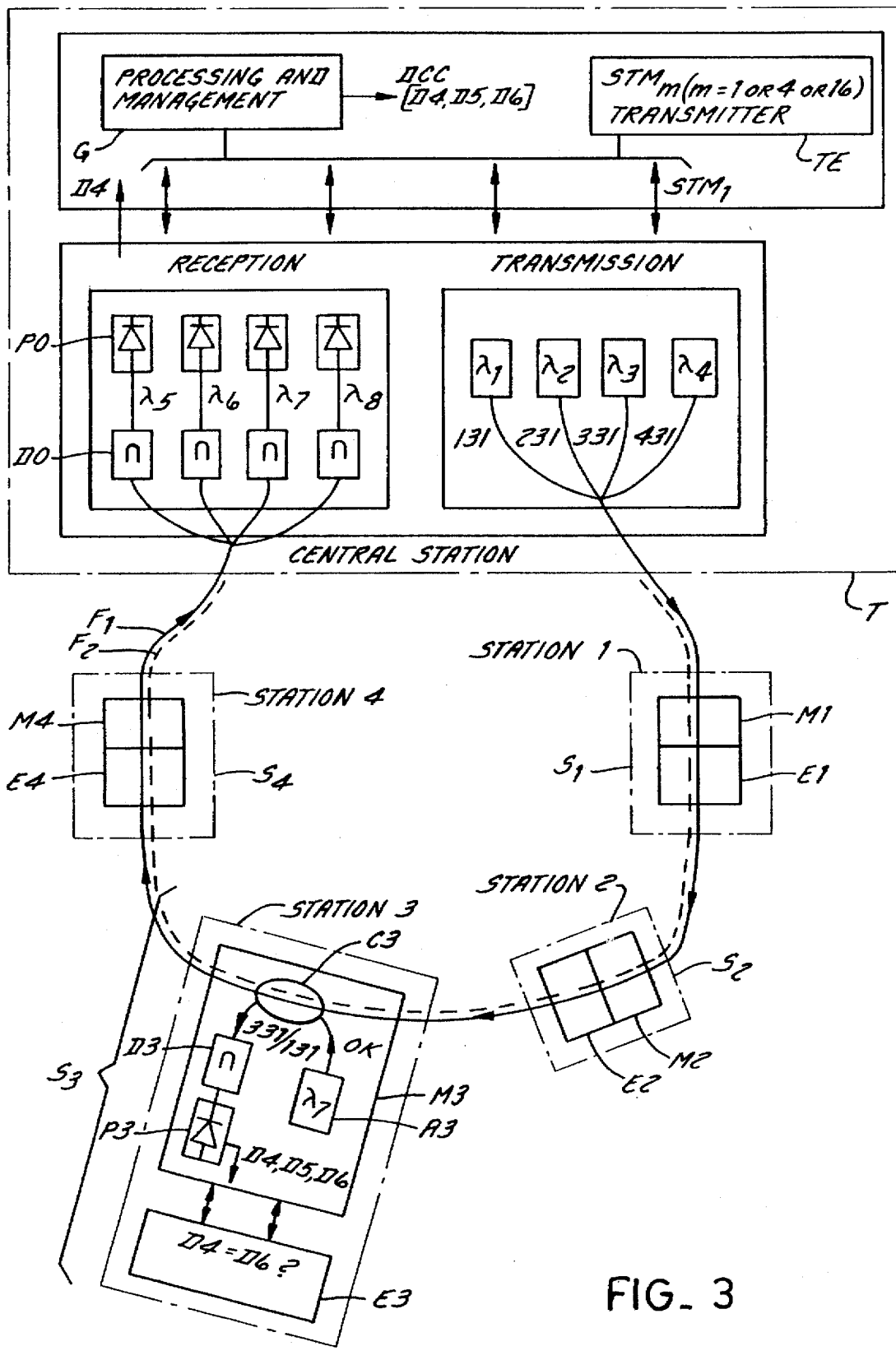
FIG_ 3

METHOD FOR THE MANAGEMENT OF WAVELENGTH-DIVISION-MULTIPLEXED OPTICAL LOOPS

BACKGROUND OF THE INVENTION

1. Field of the Invention

The invention relates to a method for the management of wavelength-division-multiplexed optical loops. It can be applied to any type of telecommunications network, namely public or private communications networks. Thus, it can be applied to national and regional telecommunication networks, local networks and computer networks.

2. Description of the Prior Art

In the field of telecommunications, the term "optical loop" refers to a set of stations connected to one another by one or more optical fibers constituting the means used to convey information elements from one station to another. These stations form variable traffic nodes. The term "wavelength-division-multiplexed optical loop" refers to a loop in which the information elements are transferred with wavelength division multiplexing. The information elements are transferred by the network from the transmission station to another station of the loop on a given wavelength of the multiplex, assigned to this station, each station having a predetermined reception wavelength.

Examples of networks using transmission on optical fibers are networks working according to the SDH (synchronous digital hierarchy) standard. These networks are organized in loops that may have two types of architecture: one-directional architecture such as the one shown schematically in FIG. 1, or a two-directional architecture.

The one-directional loop (FIG. 1) comprises a station at the "head" of the network (T) also called a central station, connected to several secondary stations (S) in a well-defined direction. Each secondary station can extract the information elements intended for it and insert other information elements that will be transmitted to the head of the network. The function of insertion/extraction known as the add/drop function is performed by means of an add/drop multiplexer or ADM.

In the example given, the transfer of information elements in the loop is done, according to the hierarchy of the SDH standard, through the optical frequency multiplex using an STM4 or STM16 frame of digital data elements as a function of the number of stations of the loop. Thus, once the number of stations is greater than 4, the frame used is a 2.5 Gbits/s STM16 frame obtained by temporal electrical multiplexing of sixteen STM1 frames at 155 Mbits/s. An STM1 frame of the SDH standard comprises a section overhead field or SOH field that does not contribute to the conveyance of data elements but is used to demarcate and manage the frame. This SOH field is itself divided into two fields: the MSOH constitutes the multiplexing section overhead and the RSOH constitutes the regeneration section overhead.

The multiplexers used to carry out wavelength division multiplexing or WDM are optical frequency add/drop multiplexers referenced OF-ADM, based on acousto-optical filters or Fabry-Perot filters as well as guides using integrated optics.

At present, the type of wavelength-division-multiplexed optical loop architecture organized in a one-directional optical loop requires a centralized management protocol in the network head station.

This management protocol must enable the configuration of the stations of the loop and their reconfiguration if need be.

The article by M. W. Maeda et al., "Wavelength Division Multiple-Access Network Based On Centralized Common Wavelength Control" in IEEE Photonics Technology Letters, Vol. 5, No. 1, pp. 83–85, January 1993, recommends the use, for the network management protocol, of a specific wavelength, namely a specific optical frequency channel and a high frequency carrier.

The drawback related to the fact that a specific optical frequency channel (a determined wavelength) is used to transmit the management information to the secondary stations lies in the fact that each secondary station must have an additional optical filter to receive the management information elements arriving at this specific channel as well as the fast electronics associated with this filter.

SUMMARY OF THE INVENTION

The present invention proposes a method of management suited to a one-directional optical loop that does not have the above-mentioned drawbacks. Furthermore, the method enables the reconfiguration of the OF-ADM multiplexers of each station.

In this method, the central station manages the loop and each secondary station locally manages the information elements that it receives from the central station to reconfigure its OF-ADM multiplexer.

The management protocol according to the invention is independent of the mode of transmission of the data elements and their flow rate. It is adapted equally well to synchronous transmission and to plesiochronous transmission and is also independent of the form in which the digital data elements are transmitted.

An object of the invention more particularly is a method for the management of a network organized in a one-directional optical loop, with optical frequency multiplexing, comprising a set of traffic stations (T, S) connected to one another by one or more optical fibers forming the loop, wherein chiefly the central station (T) instructs a secondary station (Si) that it designates to tune its reception means to a given wavelength ($\lambda j$), on the basis of a message sent out permanently, during a configuration or a reconfiguration, to all the secondary stations (S1–Sn) on all the channels of the optical frequency multiplex.

According to one object of the invention, the configuration message broadcast to all the secondary stations (S1–Sn) comprises, for each transmission channel of the central station:

a first word for identifying the transmission wavelength of the transmission laser of the central station (T), a second word for identifying the designated secondary station (Si) to which the central station sends an information element on management, a third word containing the management information element enabling the secondary station (Si) to configure its optical frequency add/drop multiplexer so that its reception means are tuned to the reception wavelength ($\lambda j$) determined by the central station.

BRIEF DESCRIPTION OF THE DRAWINGS

Other particular features and advantages of the invention shall appear from the following description, given by way of an illustrative and non-restrictive example, with reference to the appended figures of which:

FIG. 1 is a drawing of a one-directional loop,

FIG. 2 is a flow chart of a mode of operation of a method according to the invention, FIG. 3 is a drawing of an example of a wavelength-division-multiplexed optical loop for the implementation of the method according to the invention.

MORE DETAILED DESCRIPTION

FIG. 2 gives a schematic view of the steps of a method of management according to the invention.

Advantageously, a method such as this is divided into two parts depending on the direction of the information elements to be transmitted, namely depending on whether the information is transmitted from the central station T to the secondary stations S (part 100) or else from a secondary station to the central station (part 300).

Each secondary station preferably has reception means that are tunable according to the density of the traffic. Now, before any activation of the network, the central station T does not have prior knowledge of the reception wavelength of the secondary stations. This is why, to be capable of instructing a particular secondary station to configure itself, i.e. to tune its reception means to a precise wavelength, the central station T sends out a configuration message to all the secondary stations on all the channels of the optical frequency multiplex.

Advantageously, this message is broadcast permanently until the central station T receives information from the secondary station designated by it in its message.

The message broadcast by the central station T to the secondary stations S comprises three words for each channel. The first word is broadcast permanently and enables the identification of the transmission wavelength of the central station laser corresponding to the channel considered. Thus, to each transmission channel, i.e. for each transmission laser of the central station, there corresponds a code. This code is preferably written in binary form. The code 1 corresponds for example to the transmission wavelength 1, the code 2 to the wavelength LAMBDA2, and so on and so forth.

The second word enables the identification of the designated secondary station to which the station T wishes to send the management information, namely the instruction on configuration.

Finally, the third word contains the management information proper. It thus enables the designated secondary station to configure its optical frequency add/drop multiplexer so that the reception means are tuned to a particular wavelength given by the central station T. To each management information element there corresponds a code which is preferably binary. Thus, the code 1 corresponds for example to the given wavelength λ1, the code number 2 to λ2, and so on and so forth.

The first two steps 10 and 20 of the flow chart of FIG. 2 correspond to what has just been described, namely to the broadcasting of a message from the station T to all the secondary stations S.

Only the designated secondary station reads and records the configuration message after having recognized the second word that designates it. In practice, the station records the third word, i.e. solely the reconfiguration or configuration code.

In practice, the station receives the first word that is broadcast permanently and re-reads the third word that has been recorded.

Once this third word has been read and recorded, the management of the information is local, namely it is performed solely by means of a known electronic processing unit associated with the optical frequency add/drop multiplexer of the designated station (cf. FIG. 3). This electronic processing unit thus enables the designated secondary station to reconfigure its multiplexer on the basis of the codes received and recorded so as to tune the reception means to a determined wavelength.

After having reconfigured its OF-ADM multiplexer, the secondary station, designated in the configuration message, performs a re-reading of this message: this is the step 40.

In the step 50, the secondary station makes a comparison, by means of its electronic processing unit, of the first word and the third word. Indeed, if the reconfiguration has been done successfully, the secondary station must, during the re-reading step, read a message in which the first word is identical to the third one, i.e. it must read the configuration message sent out on a channel for which the transmission wavelength of a laser of the station T is identical to the reception wavelength of the secondary station.

Consequently, if the result of the comparison reveals that the first word is identical to the third word (step 60), the reconfigured secondary station sends out a message comprising a message confirmation information element to the central station T. Thus, the station T knows that the reconfiguration operation has been performed successfully and that it may consequently stop the broadcasting of the configuration message.

By contrast, if the result of the comparison reveals a difference between the first word and the third word (step 70), the secondary station sends out an error message to the central station T (step 110).

In this case, the station T preferably stops the broadcasting of the message and sees to the correction of the error and/or the sending of a new message. However, it may thus continue to broadcast the message so long as the operation of configuration has not been performed successfully.

It is also provided, according to another aspect of the method of the invention, that each station will perform a test cyclically in order to ascertain that the wavelength of its OF-ADM is truly the one to which it must be tuned. This test makes it possible, inter alia, to ascertain that there is no drift of the laser or of the OF-ADM.

For this purpose, the secondary station again carries out the comparison between the first word broadcast and received and the third word recorded during a configuration. If there has been a drift, these words do not coincide for the station will receive on another wavelength, for example λ2 instead of λ1.

By providing for a time-lag device 120 so that the test takes place only at a desired frequency, the local station may use the test loop shown in FIG. 2 to verify the code of the reception wavelength and the code of the wavelength on which it is receiving.

Furthermore, according to one variant, the electronic processing circuit of the secondary station, designated in the configuration message, comprises a testing means that enables the detection of a possible malfunction (step 80) in an element of the multiplexer such as an optical filter, laser or receiver for example.

If this testing means detects a malfunction, then the secondary station sends out a warning message, step 90, to the station T. By contrast, if no malfunction is detected, the next step of the method is performed.

In the flow chart, this testing means is activated during the step 20 of reception of the message by the designated secondary station. However, it may be activated at other times in the steps of the method, for example before any broadcasting of the configuration message by the station T.

The wavelength-division-multiplexed optical loop shown in FIG. 3 illustrates an example for the implementation of the method according to the invention in case of the SDH standard. The loop is formed by a central station T and several secondary stations S. In the example, the secondary stations are four in number (S1, S2, S3, S4). The secondary stations S1–S4 each comprise an optical frequency add/drop multiplexer M1, M2, M3, M4. The central station T is formed by several lasers 1, 2, 3, 4 transmitting at different wavelengths λ1, λ2, λ3, λ4.

The messages to be broadcast are, according to one example, in the form of STM1 or STM4 or STM16 frames according to the SDH standard provided by a SDH transmitter TE. These information elements are broadcast to the other stations S1–S4 that will filter each of these wavelengths.

The multiplexer M3 of the secondary station S3 is formed the following elements: a 2×2 optical coupler C3 placed on the fibers F1, F2, a laser A3 for the insertion of the information elements in the received frame and a tunable Fabry-Perot type optical filter D3 followed by a receiver P3 for the extraction of the flow intended for the station. The filter D3 is connected to one arm of the coupler C3 while the laser A3 is connected to the other arm.

The multiplexers of the other stations M1, M2, M4 are identical. Each secondary station also has electronic processing means E1–E4 that are quite conventional for controlling the transmission laser, the reception filter and for processing the received signals.

The lasers of the different stations transmit at wavelengths that may be distinct from one another.

The network head T also has reception means comprising as many extraction optical filters D0 as there are transmitter stations placed on the loop and as many detectors P0 as there are filters D0. Like the optical filters of the secondary stations, the filters D0 of the central station T are tunable. The networkhead T comprises processing means G for transmission signals and received signals, able to implement the method according to the invention.

Advantageously, the transmission wavelength of each secondary station is different from the reception wavelength.

The following description pertains to the application of the method to the case of synchronous transmission in the form of frames according to the SDH standard.

Naturally, as already specified, the method can be applied to any other type of transmission. According to the method, the management information elements may be transmitted by high frequency or low frequency carrier. In this case, the receiver stations, in addition to their optical filter, must have an electrical filter to recover these information elements. An electrical filter is far from being as complicated and as costly as an optical filter.

In the case of the application of the method to the SDH transmission standard, the management information elements will be transmitted with the data elements of the SDH frame. In this case, as described here above, it is the multiplexing section overflow field or MSOH that is used to manage the information elements and the DCC or data communications channel of the frame in which the MSOH field is used is the channel that will be used to convey the management information elements. The message, broadcast by the central station to all the secondary stations, is encoded on different bytes of the DCC. Preferably, each word of the message is encoded on only one byte.

According to one example, byte D4 comprises the first word i.e. the word for identifiying the transmission wavelength of the transmission laser of the central station, the fifth byte D5 of the DCC comprises the second word i.e. the word for identifying the designated secondary station and the sixth byte D6 comprises the third word i.e. the management information. Thus, a message comprising for example the code 2 in the fifth byte and the code 3 in the sixth byte means that the station S2 must configure its OF-ADM so that the reception means are tuned to the wavelength λ3, should the code of the second word correspond to the station S2 and the code 3 of the third word correspond to the wavelength λ3. Naturally, there are many other possibilities since, with the MSOH comprising 45 bytes, it is possible to encode the words of the message on other bytes.

In the example shown in FIG. 3, the station T designates the station S3 so that it reconfigures its OF-ADM in such a way as to tune its reception means to the wavelength λ1. To the second and third words, there then correspond respectively the codes 3 and 1. For each channel 1 to 4, the lasers of the station T therefore respectively transmit the encoded messages 131, 231, 331 and 431. If its multiplexer is configured to receive the wavelength λ3 for example, the station S3 receives only the encoded message 331. After having recognized the code 3 corresponding to the station S3, in the second word, the station S3 reads and records the encoded message 331.

The electronic processing circuit E3 then enables the station S3 to reconfigure its multiplexer so as to tune its reception means to the wavelength λ1.

After having read and recorded the encoded message 331 a first time and reconfigured its multiplexer, the station S3 re-reads the message. When the message is re-read, with the reception means being then tuned to LAMBDA1, the station S3 must read the encoded message 131, namely the configuration message sent out by the transmission laser at the wavelength λ1 in the channel 1.

If the message read is actually 131, then the comparison of the first and third words indicates that they are identical and the station S3 sends the station T a message confirmation information element.

Conversely, if the message read is 231 for example, then it means that the reconfiguration operation has not been decisive and the station S3 sends out an error message to the station T.

Like this, in the case of SDH Standard, byte D4 comprises respectively the codes 1, 2, 3 and 4, the byte D5 coprises the code 3 and byte D6 comprises the code 1. The electronic processing circuit E3 is able to compare D4 to D6.

What is claimed is:

1. A method of managing a network organized in a one-directional optical loop, the network being an optical frequency multiplexed network having a set of traffic stations connected to one another by at least one optical fiber forming the optical loop, the set of traffic stations including a central station and a set of secondary stations, data information elements being transferred from the central station to the secondary stations over transmission channels of the central station, the method comprising the steps of:

configuring the network, the configuring step further including the following steps, performed by the central station, designating a secondary station in a configuration message, and instructing the designated secondary station to tune its reception device to a specified wavelength, the instructing step further including the step of broadcasting the configuration message to all the secondary stations on all the transmission channels of the central station.

2. A method according to claim 1, wherein the configuration message comprises, for each transmission channel of the central station:

a first word which identifies the transmission wavelength of the transmission laser of the central station, a second word which identifies the designated secondary station to which the central station sends a management information element, a third word containing the management information element, the management information element enabling the secondary station to configure its optical frequency add/drop multiplexer so that its reception device is tuned to the reception wavelength determined by the central station.

3. A method according to claim 2, further comprising the steps of:

reading and recording, at the designated secondary station, the management information contained in the configuration message, and then reading and comparing, at the designated secondary station, the first word and the third word of the message.

4. A method according to claim 3, further comprising the steps of:

determining, at the designated secondary station, as a result of the comparing step, that the first and third words of the message are identical, and in response transmitting, from the designated secondary station to the central station, a message comprising a message confirmation information word.

5. A method according to claim 3, further comprising:

determining, at the designated secondary station, as a result of the comparing step, that the first and third words of the message are different, and in response transmitting, from the designated secondary station to the central station, a message comprising a error indication word.

6. A method according to claim 1, further comprising the step of reporting a malfunction of an element of the designated secondary station to the central station on the basis of a message comprising an alarm word.

7. A method according to claim 1 wherein, should the frames be of the type meeting the synchronous digital hierarchy standard, the management of the information elements is carried out by way of the data communication channel of the frame in which a multiplexing section overhead field is used to transmit the configuration message.

8. A method according to claim 7, wherein each word of the message respectively occupies a byte of the multiplexing section overhead field of the direct communications channel of a transmission frame according to the synchronous digital hierarchy standard.

9. A method according to claim 1, wherein the management information elements are transmitted by a carrier frequency in the optical frequency channels.

10. A method according to claim 2, wherein the first word of the message is broadcast permanently.

11. A method according to claim 10, wherein each secondary station carries out a verification test enabling the detection of a drift of the laser or of the optical filter.

12. A configuration management system for a network in which data information elements are transmitted between stations on an optical fiber, the configuration system comprising:

the optical fiber; and the stations including a plurality of secondary stations, and a central station, the central station being connected to each of the plurality of secondary stations by the optical fiber, and the central station including a plurality of optical transmitters which transmit data information elements to the plurality of secondary stations using a plurality of transmission wavelengths, each of the plurality of optical transmitters transmitting configuration messages which each include a transmitted wavelength identifier which identifies a first wavelength, the first wavelength being one of the plurality of transmission wavelengths and being the transmission wavelength on which the configuration message is transmitted, a designated station identifier which identifies a secondary station designated by the confirmation message, and an instructed wavelength identifier which identifies a second wavelength, the second wavelength being another one of the plurality of transmission wavelengths and being the transmission wavelength to which the designated secondary station is instructed to tune itself, and wherein each of the plurality of optical transmitters transmits a configuration message to each of the plurality of secondary stations, such that all of the secondary stations receive a configuration message on all of the transmission wavelengths of the central station.

13. A configuration management system according to claim 12, wherein each of the secondary stations further comprises means for repetitively comparing the transmitted wavelength identifier with the instructed wavelength identifier, and means for transmitting a confirmation message to the central station, the confirmation message being transmitted to the central station when the comparing means determines that the transmitted wavelength identifier and the instructed wavelength identifier identify the same wavelength and thus determines that the respective secondary station has been properly configured, the confirmation message causing the central station to at least partially discontinue transmitting configuration messages to the secondary station.

14. A configuration management system according to claim 13, wherein the transmission of confirmation messages to each of the secondary stations is only partially discontinued in that the central station continues to transmit the transmitted wavelength identifier after it is determined that the respective secondary station is properly configured, and wherein each of the secondary stations further comprises means for storing the instructed wavelength identifier, and means for detecting drift by comparing the transmitted wavelength identifier with the stored instructed wavelength identifier.

15. A method of managing a network organized in a one-directional optical loop in which information elements are transmitted between stations, the method comprising the steps of providing a central station and a plurality of secondary stations which together form the network, the central station and the plurality of secondary stations being connected to one another by at least one optical fiber forming the optical loop, and the central station having a plurality of optical transmitters which transmit data information elements to the plurality of secondary stations using a plurality of transmission wavelengths;

configuring a secondary station, the secondary station being one of the plurality of secondary stations, the configuring step further including the steps of transmitting a first configuration message to the secondary station from the central station on a first one of the transmission wavelengths, the first configuration message identifying the transmission wavelength on which the first configuration message is being transmitted, the secondary station which is designated by the configuration message, and the transmission wavelength to which the secondary station is instructed to tune itself, and transmitting additional configuration messages to the secondary station by repeating the transmitting step on different transmission wavelengths until it is determined that the secondary station is tuned to the wavelength instructed by the central station; and repeating the configuring step for the remaining plurality of secondary stations until the remaining plurality of secondary stations are configured.

16. A method according to claim 15, wherein the configuring step further comprises the steps of determining that the secondary station is tuned to the wavelength instructed by the central station, the determining step including the step of comparing, at the secondary station, (1) the portion of the configuration message which identifies the transmission wavelength on which the first configuration message is being transmitted, with (2) the portion of the configuration message which identifies the transmission wavelength to which the secondary station is instructed to tune itself, and then transmitting a confirmation message to the central station, the confirmation message indicating that the secondary station is tuned to the wavelength instructed by the central station and thus that the secondary station is properly configured.

17. A method according to claim 16, wherein the confirmation message causes the central station to at least partially discontinue transmitting configuration messages to the secondary station.

18. A method according to claim 17, wherein the configuring step further comprises the steps of storing the portion of the configuration message which identifies the transmission wavelength to which the secondary station is instructed to tune itself, repetitively transmitting a partial configuration message to the secondary station after it has been determined that the secondary station is properly configured, the partial configuration message identifying the transmission wavelength on which the partial configuration message is being transmitted, and detecting drift at the secondary station by comparing (1) the repetitively transmitted partial configuration message with (2) the stored portion of the configuration message which identifies the transmission wavelength to which the secondary station is instructed to tune itself.

* * * * *